US009887043B2

(12) United States Patent
Lee et al.

(10) Patent No.: US 9,887,043 B2
(45) Date of Patent: Feb. 6, 2018

(54) METHOD OF MANUFACTURING DYE-SENSITIZED SOLAR CELL HAVING LIGHT ABSORPTION INCREASE MEANS AND THE SOLAR CELL (71) Applicant: Industry-Academic Cooperation Foundation, Yonsei University, Seoul (KR)

(72) Inventors: MyeongKyu Lee, Seoul (KR); JeeYoung Lee, Seoul (KR)

(73) Assignee: Industry-Academic Cooperation Foundation, Yonsei University, Seoul (KR)

( * ) Notice: Subject to any disclaimer, the term of this patent is extended or adjusted under 35 U.S.C. 154(b) by 441 days.

(21) Appl. No.: 14/339,637

(22) Filed: Jul. 24, 2014

(65) Prior Publication Data
US 2015/0027539 A1    Jan. 29, 2015

(30) Foreign Application Priority Data
Jul. 26, 2013  (KR) .................. 10-2013-0088430

(51) Int. Cl.
H01L 21/20        (2006.01)
H01G 9/20         (2006.01)

(52) U.S. Cl.
CPC .......... *H01G 9/2031* (2013.01); *H01G 9/209* (2013.01); *H01G 9/2059* (2013.01); *Y02E 10/542* (2013.01); *Y02P 70/521* (2015.11)

(58) Field of Classification Search
CPC ..... H01G 9/2059; H01G 9/2031; H01G 9/209
See application file for complete search history.

(56) References Cited

U.S. PATENT DOCUMENTS

| 8,647,708 | B2* | 2/2014 | Kobayashi | C09B 23/04 136/263 |
| 2008/0210296 | A1* | 9/2008 | Morooka | H01G 9/2004 136/252 |
| 2009/0235982 | A1* | 9/2009 | Okada | H01G 9/2031 136/256 |
| 2011/0132446 | A1* | 6/2011 | Lu | H01G 9/2036 136/255 |
| 2012/0118367 | A1* | 5/2012 | Song | H01G 9/2068 136/256 |
| 2013/0037089 | A1* | 2/2013 | Sasaki | H01M 14/005 136/251 |

(Continued)

FOREIGN PATENT DOCUMENTS

KR    10-2010-0132127    12/2010

*Primary Examiner* — Seahvosh Nikmanesh (57) ABSTRACT

A dye-sensitized solar cell is provided. The solar cell includes a transparent substrate; a conductive transparent electrode formed on a surface of the transparent substrate; a metal oxide particle electrode layer in which a photosensitive dye capable of absorbing light is adsorbed; a counter electrode, and an electrolyte injected between the metal oxide particle electrode layer and the counter electrode. The metal oxide particle electrode layer comprises a first electrode layer comprising metal oxide particles and having a predetermined pattern formed thereon and a second electrode layer comprising metal oxide particles and formed on the first electrode layer. Refractive indexes of the first and second electrode layers are different from each other.

20 Claims, 5 Drawing Sheets (56) References Cited

U.S. PATENT DOCUMENTS

2014/0020761 A1* 1/2014 Wakamiya .......... H01M 14/005
    136/263
2015/0000728 A1* 1/2015 Maitani ................ H01L 29/045
    136/252
2015/0303332 A1* 10/2015 Chang .................... B82Y 30/00
    136/256

* cited by examiner

METHOD OF MANUFACTURING DYE-SENSITIZED SOLAR CELL HAVING LIGHT ABSORPTION INCREASE MEANS AND THE SOLAR CELL

CROSS REFERENCE TO RELATED APPLICATION

The present application claims priority from Korean Patent Application Number 10-2013-0088430 filed on Jul. 26, 2013, the entire contents of which are incorporated herein for all purposes by this reference.

BACKGROUND OF THE INVENTION

The present invention relates to a method of manufacturing a dye-sensitized solar cell (DSSC) and the solar cell, and more particularly, to a dye-sensitized solar cell having a means capable of increasing light absorption to thus improve efficiency of the cell and a method of manufacturing the same.

A dye-sensitized solar cell (DSSC) is a solar cell that was invented at early 1990's using a photosynthesis principle of a plant by Professor Gratzel of Swiss Federal Institute of Technology Zürich and is a sandwich-type cell in which an electrolyte solution containing oxidation/reduction bands is interposed between two glass substrates having a transparent conductive film coated thereon. After the DSSC is published, researches haven been performed at home and abroad, including universities, research institutes and manufacturers. In particularly, many efforts have been made so as to increase energy conversion efficiency thereof.

In an existing solar cell, an absorption process of solar energy and a process of separating an electron-hole pair to make a current of electricity simultaneously occur in a semiconductor material. However, in the DSSC, the two processes are separated, so that the solar energy is absorbed in a dye and the movement of charges is made in a metal oxide nano-particle layer such as $TiO_2$.

Basically, the DSSC includes upper and lower transparent substrates (for example, glass substrates), conductive transparent electrodes formed on surfaces of the transparent substrates, a photosensitive dye capable of absorbing a visible ray to generate an electro-hole pair and an oxide semiconductor electrode transferring the generated electrons and consisting of titanium oxide nano-particles (for example, refer to Korean Patent Application Publication No. 10-2010-132127). As the conductive transparent electrode, ITO (Indium Tin Oxide), recently FTO (Fluorine-doped Tin Oxide) having favorable stability at high temperatures is used in many cases. The electrons excited in the dye resulting from the absorption of the visible ray are transferred to the titanium oxide particles, which are an n-type semiconductor, and then transferred to the FTO to which the titanium oxide particles are contacted. At this time, the dye is regenerated through an electrochemical oxidation-reduction reaction of "$I^-/I_3^-$") contained in the liquid electrolyte, so that current is generated.

The dye is transitioned from a ground state to an excited state due to the absorption of the photon energy. The excited electrons is introduced into a conduction band of the $TiO_2$ nano-particles and is then moved to the transparent electrode and to a counter electrode through an external circuit. The dye oxidized due to the electron transfer is supplied with electrons from the electrolyte and is thus reduced. For example, platinum coated on the counter electrode exhibits a catalyst operation of reducing "$I_3^-$"of the oxidation-reduction pair to "$I^-$" and an operation of increasing reflection efficiency of sunlight having transmitted the cell.

Since the DSSC can be manufactured at lower cost than the single crystal solar cell, the amorphous solar cell and the compound semiconductor solar cell, it attracts many attentions as next-generation solar cells. The DSSC can be manufactured at low cost, does not have a harmful material of constitutional components thereof and does not cause a pollution upon waste, which is environment-friendly. Also, since the DSSC is transparent and can exhibit various colors, depending on dyes to be used, when it is attached on a window or outer wall of a building, it can express excellent aesthetic properties. Further, the unevenness of efficiency deviations is relatively small with respect to orientations and incident angles of the sunlight. Therefore, it is expected that the roles thereof are increased in the solar photovoltaic such as a building integrated photovoltaic system (BIPV), rather than a large-scaled generator, as compared to the silicon solar cell.

Like this, the DSSC has the relatively high competitive power as regards the unit cost of production and the applications thereof. However, as compared to the other solar cells based on inorganic materials, the efficiency thereof is still lower, which is a setback of the rapid commercialization. That is, after the DSSC has been invented, it attracts an attention as a potential low-cost photovoltaic device, so that the substantial developments have been made over 20 years. However, the efficiency of the DSSC is still lower than the inorganic photovoltaic cell. This is mainly caused due to the relatively lower short-circuit current density. Accordingly, it is necessary to increase the photo current so as to improve the efficiency of the DSSC.

The main constitutional element of the DSSC is the electrode layer consisting of $TiO_2$ nano-particles. The electrode layer provides a surface on which the dye directly absorbing the light is adsorbed (a sye molecule support member) and serves as a charge movement path (an electron transfer medium) moving the electrons coming from the dye. The DSSC of the related art has a high charge collection ability, a high open-circuit voltage and a favorable fill-factor. However, the DSSC does not completely absorb all photons from the visible ray and near infrared ray regions. As a result, the DSSC has the lower short-circuit photo current density than the inorganic photovoltaic device. Therefore, the main factors for improving the efficiency of the DSSC are focused on the increase in the short-circuit current density of the DSSC.

In the meantime, due to the porosity of the TiO2 electrode, the oxidation-reduction electrolyte is impregnated into the structure thereof and can be closely contacted to the semiconductor material. The TiO2 network is a receptor of the electrons generated from the photo-excited dye molecules and provides a conductive path for a collecting electrode. An oxidation-reduction species in the electrolyte transports the holes from the oxidized dye to the counter electrode. The porous $TiO_2$ electrode is typically manufactured by coating a paste including $TiO_2$ nano-particles on the conductive glass with a doctor blade or screen printing and then sintering (heat treating) the same at 450 to 500° C. The heat treatment process is required so as to remove an organic additive including a binder included in the pate and to sinter the $TiO_2$ nano-particles therebetween. Since the $TiO_2$ nano-particle layer relates to both generation and movement of the electrons, which dominates the performance of the cell, a nano-structure of the layer have attracted many attentions and have been researched. For example, electrode having other shapes such as TiO2 nanotubes, nanotubes having nano-particles filled therein and nanorods may be also used.

In the meantime, a typical Ru-based dye that has been used in the existing DSSC has a low coefficient of absorption, so that a necessary thickness of the TiO2 electrode is about 10 μm. Regarding this, when the thickness of the electrode is made to be thin, an amount of the dye to be adsorbed is not sufficient, so that an overall absorbance becomes too low. To the contrary, when the thickness of the electrode is increased, the amount of the dye to be adsorbed is increased to increase the absorbance. However, a moving distance of the electrons is correspondingly lengthened, which brings about a contrary effect as regards the performance of the cell.

The information disclosed in the background of the invention is provided only for enhancement of (or better) understanding of the background of the invention, and should not be taken as an acknowledgment or any form of suggestion that this information forms a prior art that would already be known to a person skilled in the art.

SUMMARY OF THE INVENTION

Various aspects of the present invention provide a dye-sensitized solar cell and a method of manufacturing the same capable of achieving higher efficiency than the dye-sensitized solar cell of the related art.

Also provided is a dye-sensitized solar cell and a method of manufacturing the same having a structure capable of increasing absorption of light without increasing a thickness of a metal oxide nano-particle electrode layer playing an important role in the dye-sensitized solar cell.

Also provided is a dye-sensitized solar cell and a method of manufacturing the same having a structure capable of increasing a moving path of light in a metal oxide nano-particle electrode layer to thus increase absorption of the light.

In an aspect of the present invention, provided is a method of manufacturing a dye-sensitized solar cell. The method includes the steps of providing a transparent substrate; forming a conductive transparent electrode on a surface of the transparent substrate; forming an electrode layer capable of adsorbing a photosensitive dye, wherein a first electrode layer comprising metal oxide particles is formed on the transparent electrode and is imprinted using a mold having a predetermined pattern to thus form a pattern corresponding to the pattern of the mold on the first electrode layer, and a second electrode layer comprising metal oxide particles is formed on the first electrode layer having the pattern to thus form the electrode layer comprising the first electrode layer and the second electrode layer, refractive indexes of the first electrode layer and the second electrode layer being made to be different; dipping the substrate into a solution comprising a photosensitive dye capable of absorbing light, thereby adsorbing the dye in the electrode layer, and injecting a liquid electrolyte between the electrode layer and a counter electrode.

In an illustrative embodiment, the pattern of the mold may be a regular pattern having a periodicity.

In an illustrative embodiment, in the step of forming the electrode layer, the electrode layer may be formed so that the refractive index of the first electrode layer is larger than that of the second electrode layer.

In an illustrative embodiment, in the step of forming the electrode layer, the electrode layer may be formed so that the refractive index of the first electrode layer is larger than that of the second electrode layer by using a TiCl$_4$ solution treatment.

In an illustrative embodiment, in the step of forming the electrode layer, the electrode layer may be formed so that the refractive index of the first electrode layer is larger than that of the second electrode layer by dipping the first electrode layer in a TiCl$_4$ solution having a first concentration after forming the first electrode layer and then dipping the electrode layer in a TiCl$_4$ solution having a second concentration after forming the second electrode layer.

In an illustrative embodiment, the first concentration may be larger than the second concentration.

In an illustrative embodiment, the second concentration of the TiCl$_4$ solution may be 0.04M.

In an illustrative embodiment, wherein the first concentration may be smaller than the second concentration.

In an illustrative embodiment, in the step of forming the electrode layer, the electrode layer may be formed so that the refractive index of the first electrode layer is larger than that of the second electrode layer by illuminating a laser beam to the first electrode layer to locally melt the first electrode layer, thereby enabling the first electrode layer to have a denser structure than the second electrode layer, after forming the first electrode layer.

In an illustrative embodiment, the pattern may be formed at a front end of the electrode layer with respect to an incident direction of the light.

In an illustrative embodiment, a thickness of the second electrode layer may be larger than that of the first electrode layer.

In another aspect of the present invention, provided is a dye-sensitized solar cell including a transparent substrate; a conductive transparent electrode formed on a surface of the transparent substrate; a metal oxide particle electrode layer in which a photosensitive dye capable of absorbing light is adsorbed; a counter electrode, and an electrolyte injected between the metal oxide particle electrode layer and the counter electrode. The metal oxide particle electrode layer includes a first electrode layer comprising metal oxide particles and having a predetermined pattern formed thereon and a second electrode layer comprising metal oxide particles and formed on the first electrode layer, and refractive indexes of the first and second electrode layers are different from each other.

In the solar cell, the pattern of the first electrode layer may be a regular pattern having a periodicity.

In the solar cell, the refractive index of the first electrode layer may be larger than that of the second electrode layer.

In the solar cell, the electrode layer may be formed so that the refractive index of the first electrode layer is larger than that of the second electrode layer by using a TiCl$_4$ solution treatment.

In the solar cell, the electrode layer may be formed so that the refractive index of the first electrode layer is larger than that of the second electrode layer by dipping the first electrode layer in a TiCl$_4$ solution having a first concentration after forming the first electrode layer and then dipping the electrode layer in a TiCl$_4$ solution having a second concentration after forming the second electrode layer.

In an illustrative embodiment, the electrode layer may be formed so that the refractive index of the first electrode layer is larger than that of the second electrode layer by illuminating a laser beam to the first electrode layer to locally melt the first electrode layer, thereby enabling the first electrode layer to have a denser structure than the second electrode layer, after forming the first electrode layer.

In the solar cell, the pattern may be formed at a front end of the electrode layer with respect to an incident direction of the light.

In the solar cell, a thickness of the second electrode layer may be larger than that of the first electrode layer.

As set forth above, according to the present invention, the light is diffracted and is then incident onto the light absorption layer. Therefore, as compared to a configuration where the light is perpendicularly incident, a moving path in the light absorption layer is more lengthened, so that the light absorbance is increased and the efficiency of the cell is also improved.

The methods and solar cells of the present invention have other features and advantages which will be apparent from, or are set forth in greater detail in the accompanying drawings, which are incorporated herein, and in the following Detailed Description of the Invention, which together serve to explain certain principles of the present invention.

DETAILED DESCRIPTION OF THE INVENTION

Reference will now be made in detail to exemplary embodiments of the present invention in conjunction with the accompanying drawings. Herein, detailed descriptions of some technical constructions or terms well known in the art will be omitted. In particular, descriptions of the well-known configurations of a dye-sensitized solar cell will be omitted. Even if such descriptions are omitted, the features of the present invention will be apparent to a person skilled in the art from the following description.

In a medium in which a refractive index periodically changes, the light is diffracted. According to the present invention, a nano-particle electrode layer (a light absorption layer) is formed with a light absorption increase structure, for example a periodic pattern structure to thus diffract the light. Thereby, a moving path of the light in the electrode layer is lengthened to increase the light absorbance.

Making an additional remark, the light that is incident perpendicularly on the light absorption layer has the same moving distance in the light absorption layer, i.e., the same optical path length as a thickness of the light absorption layer. However, a moving distance of the diffracted light is increased as a diffraction angle becomes larger (for example, refer to FIG. 3). Therefore, even though a dye and a thickness of an electrode to be used are fixed, when the light is diffracted and is then introduced into the light absorption layer, the optical path in the light absorption layer is lengthened, so that the light absorbance of the electrode layer is increased. That is, although the thickness of the electrode is not actually increased, the same light absorption increase effect as the case where the thickness of the electrode is increased is obtained.

In general, an electrode layer for a dye-sensitized solar cell (DSSC) is formed by coating a $TiO_2$ nano-particle paste on a glass substrate, on which fluorine-doped tin oxide (FTO) is coated, with a doctor blade or screen printing and then sintering the same.

In the meantime, in the porous material such as the $TiO_2$ nano-particle electrode layer, the refractive index changes depending on the porosity thereof. That is, as an internal structure becomes denser, the porosity decreases and the refractive index increases. The $TiO_2$ nano-particle electrode layer formed as described above is typically treated with $TiCl_4$ so as to improve the connectivity between the particles. When an electrode is dipped into a $TiCl_4$ solution, $TiO_2$ resulting from a reaction of $TiCl_4$ and $H_2O$ is condensed between the particle, which improves the connectivity between the particles and promotes flowing of charges. In one illustrative embodiment of the present invention, the $TiCl_4$ treatment is used to change the refractive index of the electrode layer.

Figure 1:
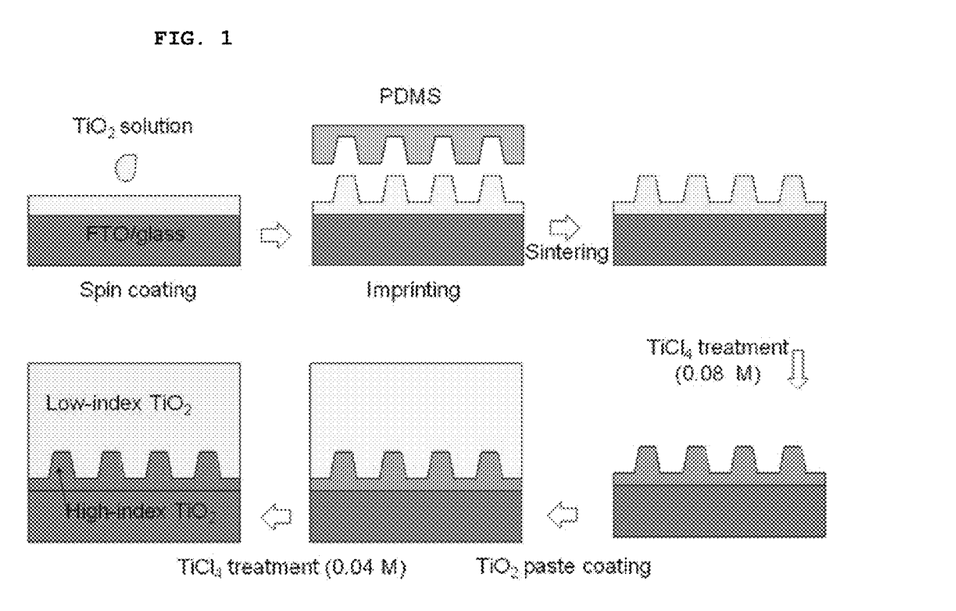
FIG. 1 is a view of pictorially illustrating a process of manufacturing a dye-sensitized solar cell (DSSC) including an electrode layer having a light absorption increase structure according to an illustrative embodiment of the present invention.

FIG. 1 is a view of pictorially illustrating a process of manufacturing a dye-sensitized solar cell (DSSC) including an electrode layer having a light absorption increase structure (which is also referred to as a diffraction grating or diffraction grating pattern) according to an illustrative embodiment of the present invention.

First, a first thin TiO2 layer is spin-coated on an FTO/glass substrate. A polydimethylsiloxane (PDMS) stamp having a predetermined periodic pattern is imprinted onto the $TiO_2$ layer without a sintering process, so that the pattern of the PDMS is transferred to the $TiO_2$ layer. Thereby, the $TiO_2$ layer has a pattern corresponding to the periodic pattern of the PDMS. Then, a sintering process is performed.

After the sintering process, a $TiCl_4$ treatment is performed by dipping the FTO/glass substrate having the $TiO_2$ layer having the periodic pattern formed thereon into a $TiCl_4$ solution having a first concentration (for example, 0.08M).

Subsequently, a second thicker $TiO_2$ layer is coated on the formed $TiO_2$ layer (for example, by the paste) and is sintered. Then, the whole layer including the first and second $TiO_2$ layers is treated with a $TiCl_4$ solution having a second concentration (for example, 0.04M), so that an electrode layer having a diffraction grating therein is formed. At this time, a total thickness of the first $TiO_2$ layer and the second $TiO_2$ layer is substantially the same as a thickness of a light absorption layer of a dye-sensitized solar cell of the related art. That is, the present invention provides a means for increasing a light absorbance without increasing a thickness of a light absorption layer of a dye-sensitized solar cell of the related art.

That is, the first $TiO_2$ layer having the periodic pattern is treated twice with the $TiCl_4$ solutions of 0.08M and 0.04M. Therefore, as compared to the second TiO2 layer treated once with the TiCl$_4$ solution of 0.04M, the first TiO$_2$ layer has a denser structure, so that a refractive index thereof is also larger. In this way, the TiO2 layer is configured by the two layers of the first TiO$_2$ layer having the periodic pattern and the second TiO$_2$ layer having no periodic pattern and the refractive indexes of the respective layers are made to be different from each other. Thereby, as described later, the incident light is diffracted in the TiO$_2$ layer and is then incident, so that the optical path is lengthened.

Meanwhile, in one illustrative embodiment of the present invention, the first TiO$_2$ layer is formed to be thinner than the second TiO$_2$ layer, as shown. That is, as described above, the first TiO$_2$ layer is treated twice by the TiCl$_4$ solution, differently from the second TiO$_2$ layer. Thereby, the refractive index increases but an internal surface area of the first TiO$_2$ layer is reduced due to the TiCl$_4$ solution treatment, so that an amount of a dye to be adsorbed may decrease. Therefore, if the thickness of the first TiO$_2$ layer in the overall electrode layer is made to be relatively too large, an amount of a dye to be adsorbed is overall decreased, so that the light absorption increase effect may be deteriorated. Thus, it is preferable to make the thickness of the second TiO$_2$ layer larger than the thickness of the first TiO$_2$ layer.

In the meantime, according to the observation of the inventors, when the first TiO$_2$ layer was treated with a TiCl$_4$ solution of a high concentration (0.16M, 0.32M), the performance of an actually manufactured device was lowered. In particular, a fill-factor was considerably reduced. This is because a size of an internal pore is too reduced and an electrolyte cannot smoothly permeate the layer. On the other hand, for a combination of 0.04M+0.04M, a difference of the refractive indexes was not sufficient, so that the strength of a diffraction beam was very weak.

In the above illustrative embodiment, after the first TiO$_2$ layer was treated with the 0.08M TiCl$_4$ solution, the TiO$_2$ layer and the second TiO$_2$ layer were treated with the 0.04M TiCl$_4$ solution. That is, the TiCl$_4$ solution is performed in order of the high concentration and the low concentration. However, the present invention is not limited thereto. That is, the TiCl$_4$ solution may be performed in order of the low concentration and the high concentration. Even in this case, since the first TiO$_2$ layer is treated twice, the refractive index thereof becomes larger than that of the second TiO$_2$ layer, so that it is possible to obtain the light absorption increase effect. At this time, when the second TiO$_2$ layer, which is a main absorption layer, is treated with the too high concentration (for example, 0.08M), the internal surface area thereof may be reduced, so that an amount of a dye to be adsorbed may decrease. A typical TiCl$_4$ solution treatment condition is 0.04M. Therefore, considering the typical TiCl$_4$ solution treatment condition, it is preferable to perform the solution treatment with different concentrations, thereby making the refractive indexes different.

Meanwhile, in the above illustrative embodiment, the refractive indexes of the first and second TiO$_2$ layers are made to be different by the TiCl$_4$ treatment. However, the method of making the refractive indexes different is not limited to the above illustrative embodiment. That is, since the TiCl$_4$ treatment is generally performed when manufacturing the DSSC so as to increase the denseness, the TiCl$_4$ treatment is applied to make the refractive indexes different in the above illustrative embodiment. However, a laser may be also used. That is, when a laser beam is illuminated after forming the first TiO$_2$ layer, TiO$_2$ nano-particles are locally melted, so that a denser structure than the second TiO$_2$ layer is formed. Like this, when the denseness of the internal structure of the porous material is different, the refractive indexes are also different, so that it is possible to obtain a diffraction effect of the light, like the above illustrative embodiment.

In the meantime, the pattern formed on the first TiO$_2$ layer, i.e., the pattern formed with the PDMS is not limited to the above illustrative embodiment (the pattern formed as in the above illustrative embodiment is also referred to as a regular pattern having a periodicity, a regularity pattern and the like). That is, an irregular pattern may be also formed. However, a regular pattern having a periodicity is preferable, like the above illustrative embodiment. That is, if the pattern is irregular, the diffraction strength may be weakened due to the scattering effect. Therefore, it is preferable to form a regular pattern having a periodicity on the first TiO$_2$ layer.

Also, as shown, the regular pattern having a periodicity, i.e., the diffraction grating pattern is preferably formed at a front end of the light absorption layer. By doing so, it is possible to lengthen the optical path, irrespective of the wavelengths of the light. That is, the light of all wavelength regions is not absorbed in the light absorption layer. When the diffraction grating pattern is formed at a rear end, not the front end of the light absorption layer, an optical path of the light of a wavelength having a high absorbance is not lengthened. This is because when the light reaches the diffraction grating through the light absorption layer, the length of the light has been already weakened. Therefore, when the diffraction pattern is formed at the rear end of the light absorption layer, only the light in a specific wavelength region, which is not absorbed and transmits, can be diffracted. However, as in the above illustrative embodiment, when the diffraction grating pattern is formed at the front end of the light absorption layer, the light in all wavelength regions is diffracted and is then incident onto the light absorption layer, irrespective of the wavelengths thereof.

Figure 2:
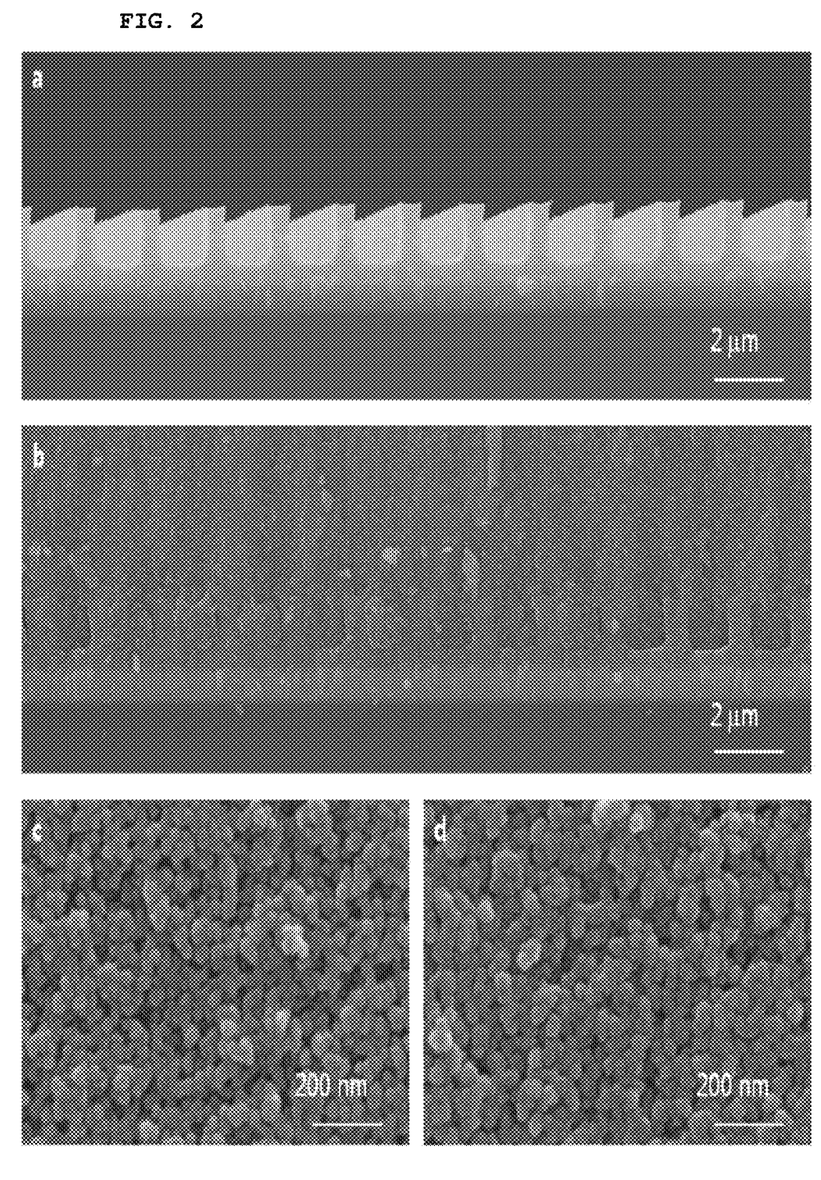
FIG. 2 is microscope photographs showing a diffraction grating pattern and shapes of $TiO_2$ layer treated with different concentrations of $TiCl_4$ according to an illustrative embodiment of the present invention.

FIG. 2 is microscope photographs showing an internal structure of an electrode having a rectangular grating of a period d=2 μm. It can be seen that the pattern formed at an early stage and the layer coated at a later stage are closely contacted to each other and a denser structure is formed in the grating. It was measured that the TiO$_2$ layer treated once with the 0.04M TiCl$_4$ solution has a refractive index of 1.55 to 1.60 in the visible ray region and the TiO$_2$ layer treated twice with the 0.08M and 0.04M TiCl$_4$ solutions has a refractive index of 1.95 to 2.05 in the visible ray region.

Figure 3:
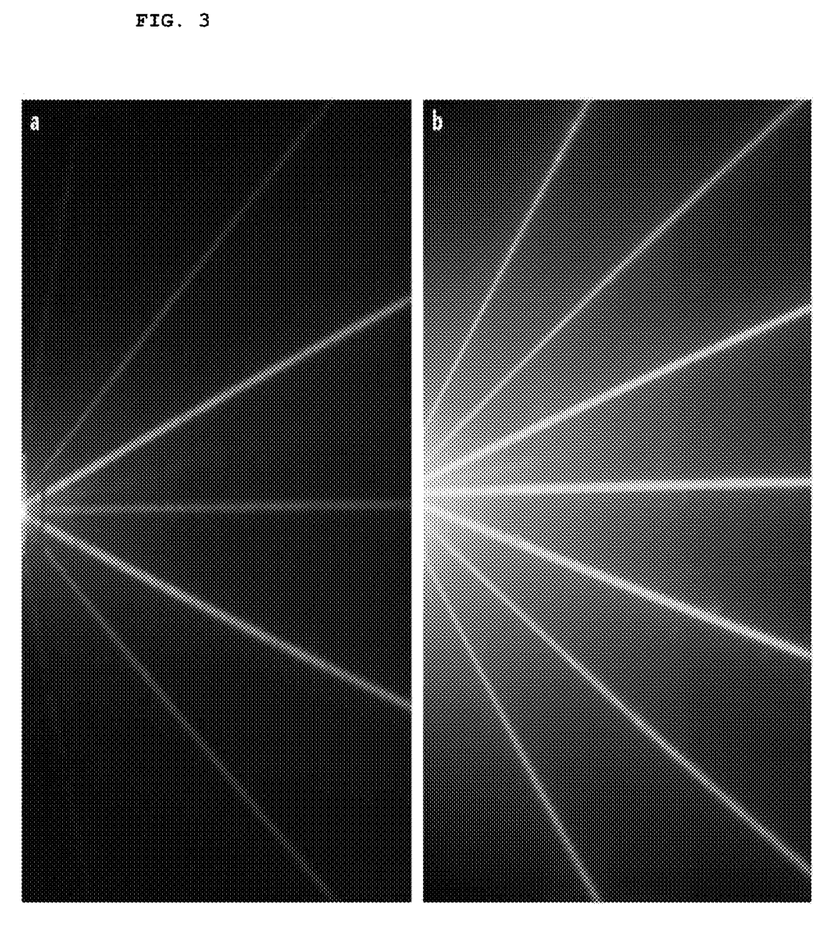
FIG. 3 is images showing that a laser beam is diffracted by a diffraction grating pattern formed at a front end of a light absorption layer according to an illustrative embodiment of the present invention, in which it can be seen that diffraction beam patterns of not only $1^{st}$ and $2^{nd}$ orders but also a $3^{rd}$ order are obtained.

FIG. 3 shows that the laser beams having a red wavelength (a in FIG. 3) and a green wavelength (b in FIG. 3) are diffracted by the electrode having the diffraction grating formed therein according to the above illustrative embodiment. A diffraction angle θ is well matched with a following equation relating to the diffraction.

$$m\lambda = 2\,d\,\sin\theta\ (m=\text{diffraction order, 1, 2, 3,}\ldots)\quad \text{(Bragg's law)}$$

in the equation, d is a period of the pattern. Not only $1^{st}$ order and $2^{nd}$ order diffraction beams but also a $3^{rd}$ order diffraction beam was also observed. Also, the diffraction efficiency (a ratio of an intensity of a diffraction beam to an intensity of an incident beam) was about 70 to 80%.

Figure 4:
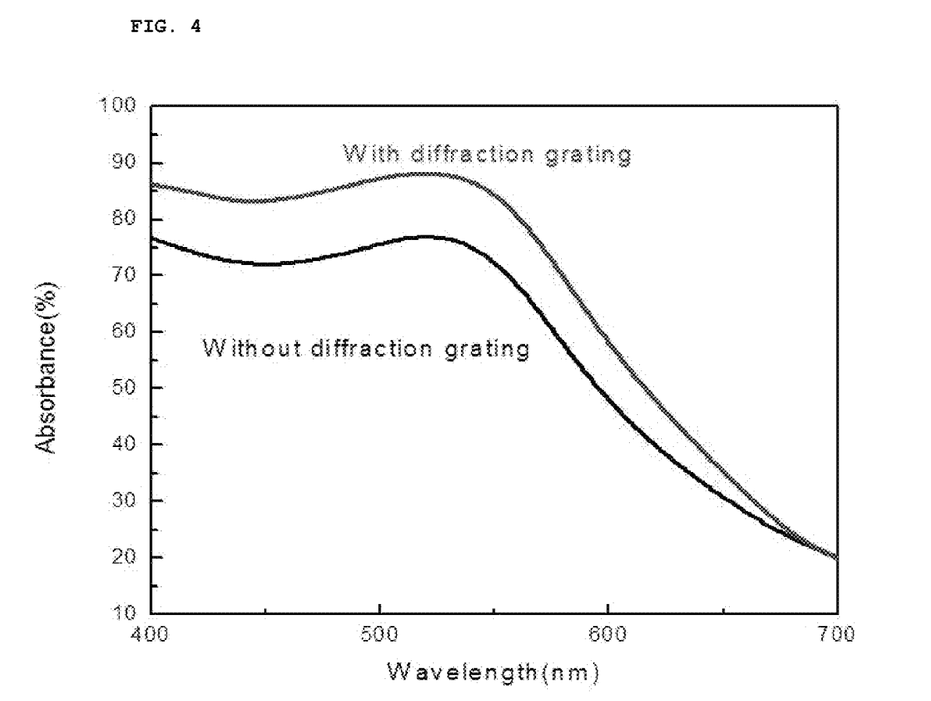
FIG. 4 shows light absorbance over wavelengths of a light absorption layer having a diffraction grating pattern formed therein according to an illustrative embodiment of the present invention and a light absorption layer having no diffraction grating pattern.

FIG. 4 shows light absorbance (A) over wavelengths of the electrode in which D719 dye was adsorbed. The absorbance was calculated by measuring reflectance (R) and transmittance (T) and then an equation of A=R+T. It can be seen that when the diffraction grating is formed, the absorbance of the electrode is increased over the entire visible ray region.

Figure 5:
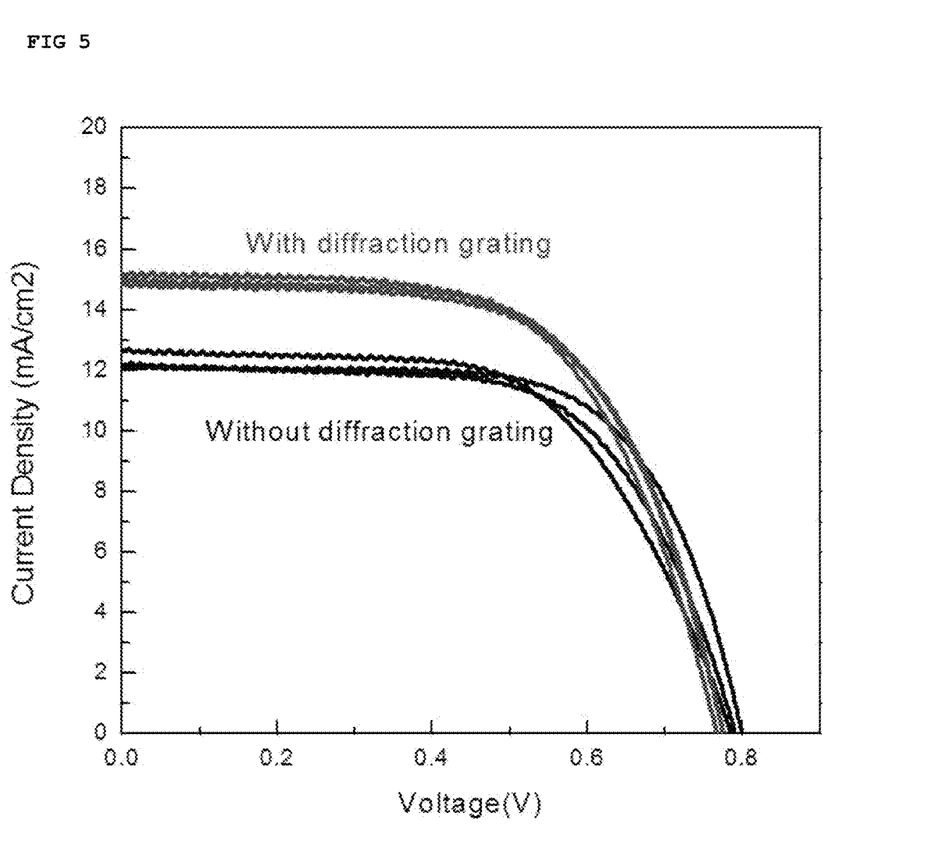
FIG. 5 shows I-V characteristics of a dye-sensitized solar cell including a light absorption layer having a diffraction grating pattern formed therein according to an illustrative embodiment of the present invention and a dye-sensitized solar cell including a light absorption layer having no diffraction grating pattern.

The inventors manufactures an electrode layer having the light absorption increase structure formed therein according to the above illustrative embodiment, manufactured a dye-sensitized solar cell including the corresponding electrode layer and a dye-sensitized solar cell not including the corresponding electrode layer and measures I-V characteristics of the cells. The results are shown in FIG. 5. As shown in FIG. 5, it can be seen that the current density and the efficiency were stably increased owing to the light absorption increase structure.

Although the present invention has been described in relation to the certain illustrative embodiments, it should be understood that the present invention is not limited thereto. For example, the present invention is not limited to the various materials of the dye-sensitized solar cell described in the above illustrative embodiment and can be widely applied to the general dye-sensitized solar cell. The foregoing embodiments can be made into various alterations and modifications without departing from the scope of the appended Claims, and all such alterations and modifications fall within the scope of the present invention. Therefore, the present invention shall be defined by only the claims and their equivalents.

The invention claimed is:

1. A method of manufacturing a dye-sensitized solar cell, comprising steps of:
   providing a transparent substrate;
   forming a conductive transparent electrode on a surface of the transparent substrate;
   forming an electrode layer capable of adsorbing a photosensitive dye, wherein a first electrode layer comprising metal oxide particles is formed on the transparent electrode and is imprinted using a mold having a predetermined pattern to thus form a diffraction grating pattern corresponding to the pattern of the mold on the first electrode layer so that an optical path is lengthened, and a second electrode layer comprising metal oxide particles is formed on the first electrode layer having the diffraction grating pattern to thus form the electrode layer comprising the first electrode layer and the second electrode layer, a refractive index of the first electrode layer is larger than that of the second electrode layer by making structure of the first electrode layer denser than that of the second electrode layer;
   dipping the substrate into a solution comprising a photosensitive dye capable of absorbing light, thereby adsorbing the dye in the electrode layer, and
   injecting a liquid electrolyte between the electrode layer and a counter electrode.

2. The method according to claim 1, wherein the diffraction grating pattern of the mold is a regular pattern having a periodicity.

3. The method according to claim 1, wherein in the step of forming the electrode layer, the electrode layer is formed so that the refractive index of the first electrode layer is larger than that of the second electrode layer by using a $TiCl_4$ solution treatment.

4. The method according to claim 3, wherein in the step of forming the electrode layer, the electrode layer is formed so that the refractive index of the first electrode layer is larger than that of the second electrode layer by dipping the first electrode layer in a $TiCl_4$ solution having a first concentration after forming the first electrode layer and then dipping the electrode layer in a $TiCl_4$ solution having a second concentration after forming the second electrode layer.

5. The method according to claim 4, wherein the first concentration is larger than the second concentration.

6. The method according to claim 5, wherein the second concentration of the $TiCl_4$ solution is 0.04M.

7. The method according to claim 4, wherein the first concentration is smaller than the second concentration.

8. The method according to claim 7, wherein the second concentration of the $TiCl_4$ solution is 0.04M.

9. The method according to claim 1, wherein in the step of forming the electrode layer, the electrode layer is formed so that the refractive index of the first electrode layer is larger than that of the second electrode layer by illuminating a laser beam to the first electrode layer to locally melt the first electrode layer, thereby enabling the first electrode layer to have a denser structure than the second electrode layer, after forming the first electrode layer.

10. The method according to claim 1, wherein the pattern is formed at a front end of the electrode layer with respect to an incident direction of the light.

11. The method according to claim 1, wherein a thickness of the second electrode layer is larger than that of the first electrode layer.

12. A method of manufacturing a dye-sensitized solar cell, comprising steps of:
    providing a transparent substrate;
    forming a conductive transparent electrode on a surface of the transparent substrate;
    forming an electrode layer capable of adsorbing a photosensitive dye, wherein a first electrode layer comprising metal oxide particles is formed on the transparent electrode and is imprinted using a mold having a predetermined pattern to thus form a pattern corresponding to the pattern of the mold on the first electrode layer, and a second electrode layer comprising metal oxide particles is formed on the first electrode layer having the pattern to thus form the electrode layer comprising the first electrode layer and the second electrode layer, refractive indexes of the first electrode layer and the second electrode layer being made to be different;
    dipping the substrate into a solution comprising a photosensitive dye capable of absorbing light, thereby adsorbing the dye in the electrode layer, and
    injecting a liquid electrolyte between the electrode layer and a counter electrode,
    wherein in the step of forming the electrode layer, the electrode layer is formed so that the refractive index of the first electrode layer is larger than that of the second electrode layer by illuminating a laser beam to the first electrode layer to locally melt the first electrode layer, thereby enabling the first electrode layer to have a denser structure than the second electrode layer, after forming the first electrode layer.

13. The method according to claim 12, wherein in the step of forming the electrode layer, the electrode layer is formed so that the refractive index of the first electrode layer is larger than that of the second electrode layer by using a $TiCl_4$ solution treatment.

14. The method according to claim 13, wherein in the step of forming the electrode layer, the electrode layer is formed so that the refractive index of the first electrode layer is larger than that of the second electrode layer by dipping the first electrode layer in a $TiCl_4$ solution having a first concentration after forming the first electrode layer and then dipping the electrode layer in a $TiCl_4$ solution having a second concentration after forming the second electrode layer.

15. The method according to claim 14, wherein the first concentration is larger than the second concentration.

16. The method according to claim 15, wherein the second concentration of the $TiCl_4$ solution is 0.04M.

17. The method according to claim 14, wherein the first concentration is smaller than the second concentration.

18. The method according to claim 17, wherein the second concentration of the $TiCl_4$ solution is 0.04M.

19. The method according to claim 12, wherein the pattern is formed at a front end of the electrode layer with respect to an incident direction of the light.

20. The method according to claim 12, wherein a thickness of the second electrode layer is larger than that of the first electrode layer.

* * * * *